US012202161B2

(12) United States Patent
Lumpkins

(10) Patent No.: US 12,202,161 B2
(45) Date of Patent: Jan. 21, 2025

(54) DEVICES AND SYSTEMS FOR ASSISTING WITH SHAVING

(71) Applicant: Delicia Lumpkins, Santa Barbara, CA (US)

(72) Inventor: Delicia Lumpkins, Santa Barbara, CA (US)

(73) Assignee: Delicia Lumpkins, Santa Barbara, CA (US)

( * ) Notice: Subject to any disclaimer, the term of this patent is extended or adjusted under 35 U.S.C. 154(b) by 318 days.

(21) Appl. No.: 17/484,302

(22) Filed: Sep. 24, 2021

(65) Prior Publication Data

US 2023/0098412 A1 Mar. 30, 2023

(51) Int. Cl.
*B26B 21/52* (2006.01)

(52) U.S. Cl.
CPC .......... *B26B 21/527* (2013.01); *B26B 21/521* (2013.01)

(58) Field of Classification Search
CPC ...... B26B 21/527; B26B 21/521; B26B 21/52
USPC .......................................................... 30/526
See application file for complete search history.

(56) References Cited

U.S. PATENT DOCUMENTS

| | | | | |
|---|---|---|---|---|
| 3,834,021 | A * | 9/1974 | White ................ A61B 17/2804 | 606/174 |
| 4,309,821 | A * | 1/1982 | Terry ...................... B26B 21/16 | 403/380 |
| 5,357,680 | A | 10/1994 | Monistere | |
| 6,029,356 | A * | 2/2000 | Sprinkle ................ B26B 21/08 | 30/526 |
| 10,449,683 | B2 * | 10/2019 | Spencer .............. B26B 21/4018 | |
| 10,780,598 | B2 | 9/2020 | Park | |
| 11,104,021 | B1 * | 8/2021 | Simkovitz ............ B26B 21/525 | |
| 2003/0033717 | A1 | 2/2003 | Cecil | |
| 2015/0183119 | A1 | 7/2015 | Contaldi | |
| 2020/0290226 | A1 * | 9/2020 | Lucchese ............. B26B 21/521 | |

FOREIGN PATENT DOCUMENTS

| | | |
|---|---|---|
| CN | 103945996 | 7/2014 |
| CN | 203973586 | 12/2014 |
| CN | 108214572 | 6/2018 |
| EP | 3398735 | 11/2018 |
| JP | 2002018160 | 1/2002 |
| JP | 2005118286 | 5/2005 |
| JP | 2019155028 | 9/2019 |

* cited by examiner

*Primary Examiner* — Nhat Chieu Q Do
(74) *Attorney, Agent, or Firm* — Ferguson Case Orr Paterson

(57) ABSTRACT

Described herein is an improved shaving device. The shaving device can include a first finger portion defining a first aperture configured for a user to place a first finger therethrough, a second finger portion defining a second aperture configured for a user to place a second finger therethrough, and a shaving holding portion under the first and second finger portions. The shaver holding portion can define a cartridge apertures in an underside thereof configured to hold a razor cartridge. The shaving device can include male and female connectors such that it can be connected to other such devices for, among other things, increased shaving area.

18 Claims, 4 Drawing Sheets

216a
210a
216b
210b
214
212
250
230
240
234
252
212e
212e
230a
230
252b
252c 200
216
212b
210
212c
216
212d
236
212a
214a
a
b
214b
214c
214d
234
218
218
250b
250a
232
240a
232

232
240b
232
230b
252

DEVICES AND SYSTEMS FOR ASSISTING WITH SHAVING

The present application is related to the concurrently filed design patent application entitled SHAVING DEVICE to Lumpkins, U.S. Des. patent application Ser. No. 29/809,024, the entire contents of which are hereby incorporated by reference in their entirety.

BACKGROUND OF THE DISCLOSURE

Field of the Disclosure

Embodiments of the present disclosure relate to shaving devices. More specific embodiments of the present disclosure relate to improved shaving devices for shaving a user's legs and/or other body parts. Even more specific embodiments of the present disclosure relate to shaving devices for attachment to a user's fingers, which can include a plurality of finger attachment portions and one or more head portions, which can themselves include razor cartridges.

Related Art

FIG. 1A shows a prior art disposable safety razor 100 including a handle portion 102 and a head portion 104. The disposable safety razor 100 is ubiquitous in society and used for shaving facial and body hair, such as leg hair. Typically, a user will hold the handle portion and run the head portion 104 over the skin of the area from which the user desires to remove hair. Similarly, FIG. 1B shows a prior art cartridge safety razor 150, which includes a handle portion 152 and a head portion 154 comprising a removable and replaceable cartridge 156. The razor 150 is often considered to be an improvement over the disposable safety razor 100 because of improved materials and the ability to reuse the handle portion 152 with new/replacement cartridges 156.

SUMMARY OF THE DISCLOSURE

Described herein are improved shaving devices. Some embodiments of the improved shaving devices include finger portions with apertures for a user to place fingers therethrough, and shaver holding portions which can hold devices such as razors. In some embodiments, two shaving device bodies can be connected to one another to form a larger shaving device.

In one embodiment of the disclosure, a shaving device includes a first finger portion defining a first aperture configured for a user to place a first finger therethrough, and a second finger portion defining a second aperture configured for a user to place a second finger therethrough. The shaving device also includes a shaver holding portion under the first and second finger portions. The shaver portion defines a cartridge aperture in an underside thereof configured to hold a razor cartridge.

In another embodiment of the disclosure, a shaving device includes first and second bodies each having two finger portions and a shaver holding portion. One of the bodies includes a female connector on a side of its shaver holding portion, and the other of the bodies includes a male connector on a side of its shaver holding portion.

In yet another embodiment of the disclosure, a shaving device includes a monolithic body having first and second finger portions each defining an aperture for a user to place a finger therethrough, and a shaver holding portion under the finger portions, the shaver holding portion defining a cartridge aperture configured to hold a razor cartridge. The shaver holding portion includes two flanges underneath the cartridge aperture. The shaving device further includes a razor cartridge held by the monolithic body in the cartridge aperture.

These and other further features and advantages of the disclosure would be apparent to those skilled in the art from the following detailed description.

DETAILED DESCRIPTION OF THE DISCLOSURE

Figure 1A:
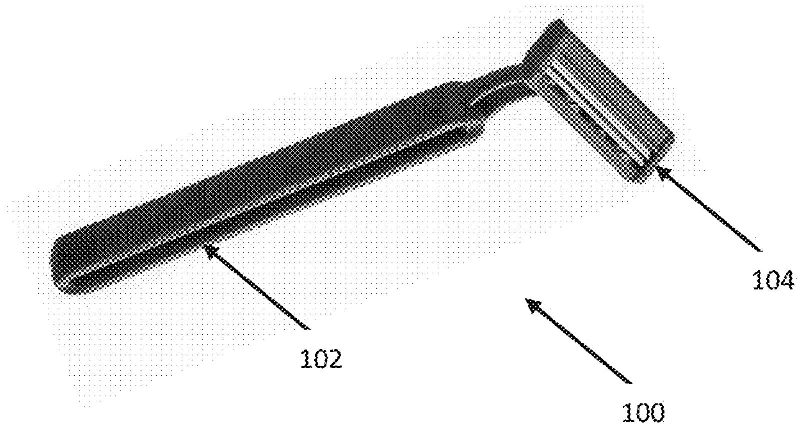
FIG. 1A is a perspective view of a prior art shaving device.
Figure 1B:
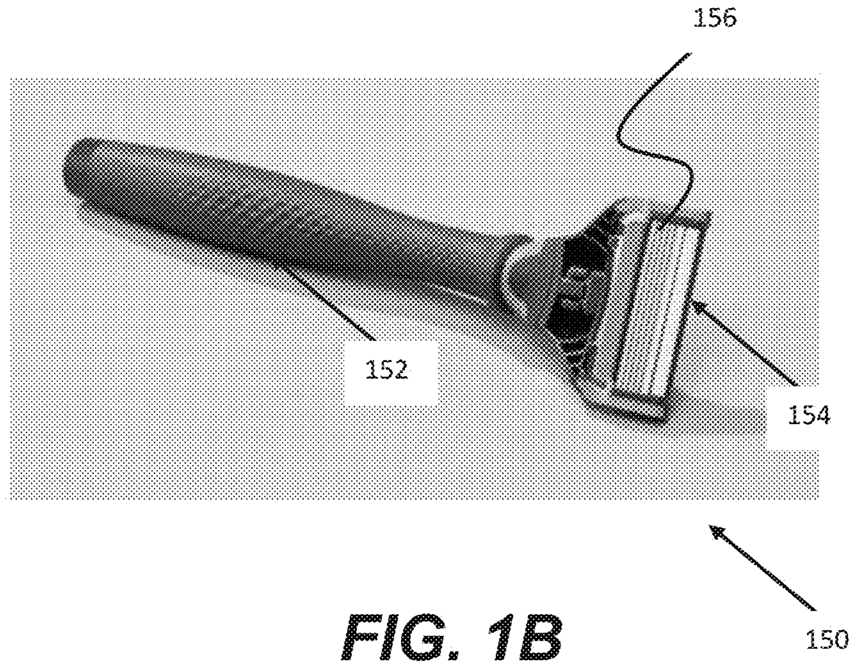
FIG. 1B is a perspective view of another prior art shaving device.

Embodiments of the present disclosure are directed to improved shaving devices. Some specific embodiments of the present disclosure are directed toward shaving devices with multiple shaving surfaces for increased efficiency, wherein the shaving surfaces may be held at different angles for adapting to contoured and curved surfaces such as those of a user's legs. For instance, one embodiment utilizes two bodies each holding one or more razor cartridges. The bodies can each include two finger apertures for attachment to two of a user's fingers, and the bodies can be detachably connected to one another such that a user can attach the two-body device to four fingers of a single hand. The bodies can be movable relative to one another to allow the user to adapt the device to the shape of the surface to be shaved, such as his or her leg. Each individual shaving device (i.e., each one-body shaving device, as opposed to the shaving device including two connected bodies) can also have distinct advantages over prior art shaving devices, in that it can provide for better control and a more secure connection to a user's hands and/or fingers.

Embodiments of the disclosure are described herein with reference to illustrations that are schematic illustrations of embodiments of the disclosure. As such, the actual size, components and features can be different, and variations from the shapes of the illustrations as a result, for example, of technological capabilities, manufacturing techniques and/or tolerances are expected. Embodiments of the disclosure should not be construed as limited to the particular shapes or components of the regions illustrated herein but are to include deviations in shapes/components that result, for example, from manufacturing or technological availability. The regions illustrated in the figures are schematic in nature and their shapes are not intended to illustrate the precise shape or functionality of a feature of a device and are not intended to limit the scope of the disclosure. In addition, components may be shown as one unit but may instead be a collection of components or units, or a collection of components or units may exist as one unit.

Throughout this description, the preferred embodiment and examples illustrated should be considered as exemplars, rather than as limitations on the present disclosure. As used herein, the term "disclosure," "device," "method," "present disclosure," "present device" or "present method" refers to any one of the embodiments of the disclosure described herein, and any equivalents. Furthermore, reference to various feature(s) of the "disclosure," "device," "method," "present disclosure," "present device" or "present method" throughout this document does not mean that all claimed embodiments or methods must include the referenced feature(s).

It is also understood that when an element or feature is referred to as being "on" or "adjacent" another element or feature, it can be directly on or adjacent to the other element or feature, or intervening elements or features may also be present. It is also understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures. In terms of the present figures, generally speaking and unless the context dictates otherwise, the "height" direction is vertical with respect to the view shown in FIG. 2B (and thus the top of FIG. 2B is "above" the bottom of FIG. 2B), the "width" direction is horizontal with respect to the view shown FIG. 2B, and the "depth" direction is into the page with respect to the view shown in FIG. 2B.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Figures 2A, 2B:
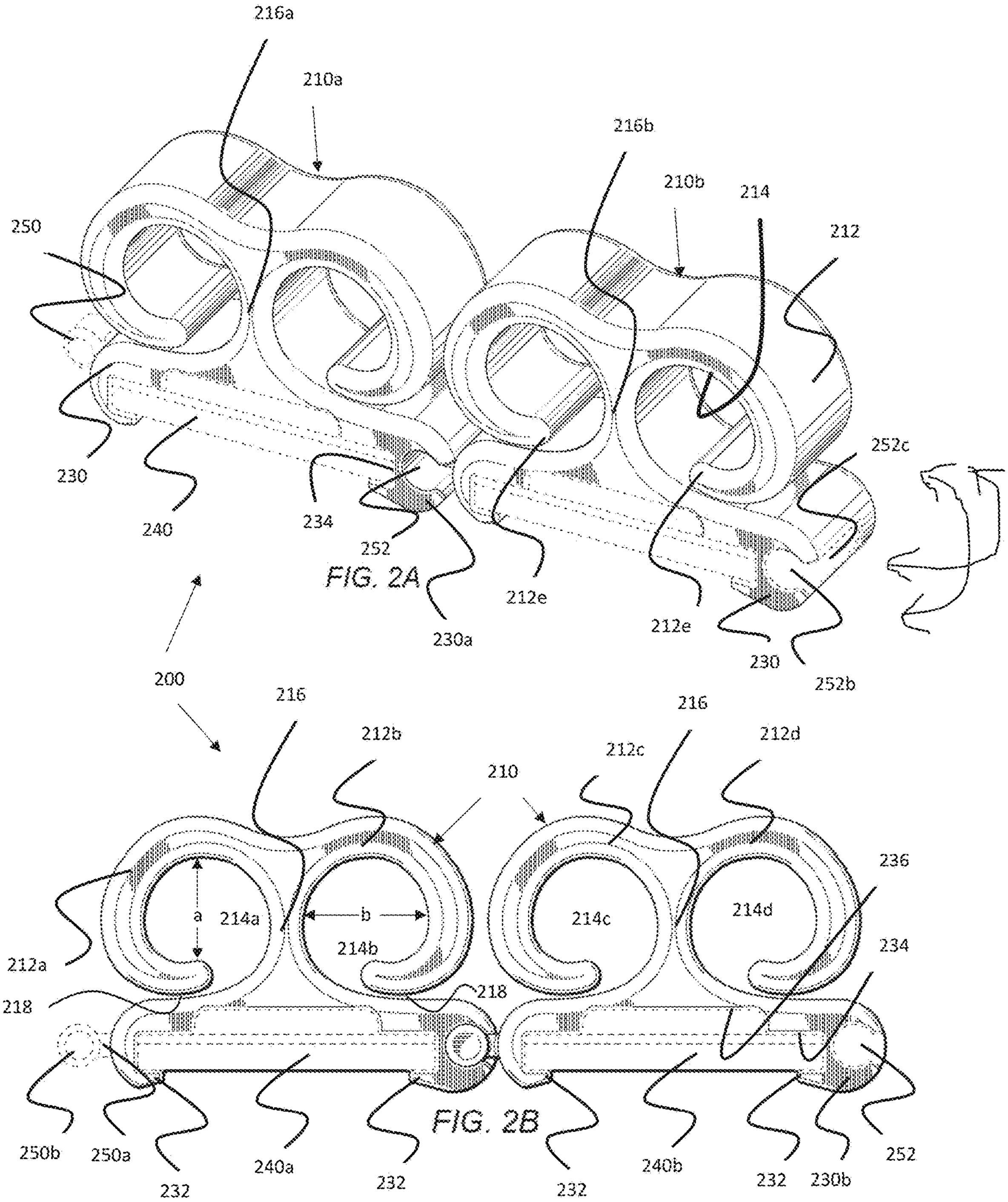
FIGS. 2A-2C are perspective, front, and top views, respectively, of a shaving device according to one embodiment of the present disclosure.
Figure 2C:
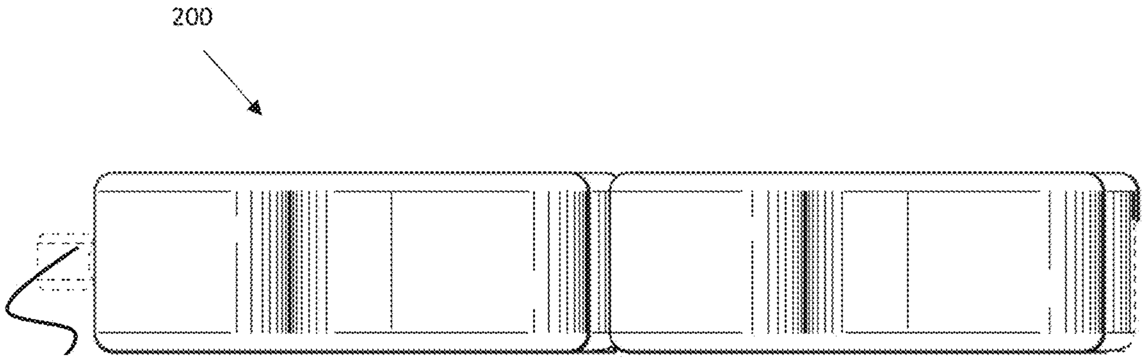

FIGS. 2A-2C show a shaving device 200 according to one embodiment of the present disclosure. The shaving device 200 can include one or more bodies 210, and in the specific embodiment shown includes two bodies 210*a*,210*b*. Each body 210 can include one or more finger portions 212, which can themselves form finger apertures 214. For instance, in the specific embodiment shown, the body 210*a* includes two finger portions 212*a*,212*b*, each with a respective aperture 214*a*,214*b*; and the body 210*b* includes two finger portions 212*c*,212*d*, each with a respective finger aperture 214*c*,214*d*. The finger portions 212 of a body 210 can be separate from one another, or (as shown) can be joined and/or share a middle/connecting portion such as the connecting portions 216*a*,216*b*.

The finger portions 212 and/or apertures 214 can have a variety of shapes including a substantially circular shape (as shown), square shapes, polygon shapes, non-polygon shapes, etc. A substantially circular shape such as that included in the embodiment of the shaving device 200 can be beneficial in that it can substantially correspond to the shape of a user's fingers. In the specific embodiment shown, the finger portions and apertures 212,214 are spiral shaped, with the ends 212*e* of the finger portions 212 tucking inwards toward the center of the bodies 210 and/or toward the connecting portions 216. The shape of the finger portions 212 and/or apertures 214 can be closed (such that the bottom connects to the portion thereunder) or, as shown, open (such as including the open areas 218). An open shape can be more flexible, which can be beneficial in that it can better fit the varying shapes of a user's fingers, while a closed shape can provide more sturdiness.

Figure 3A:
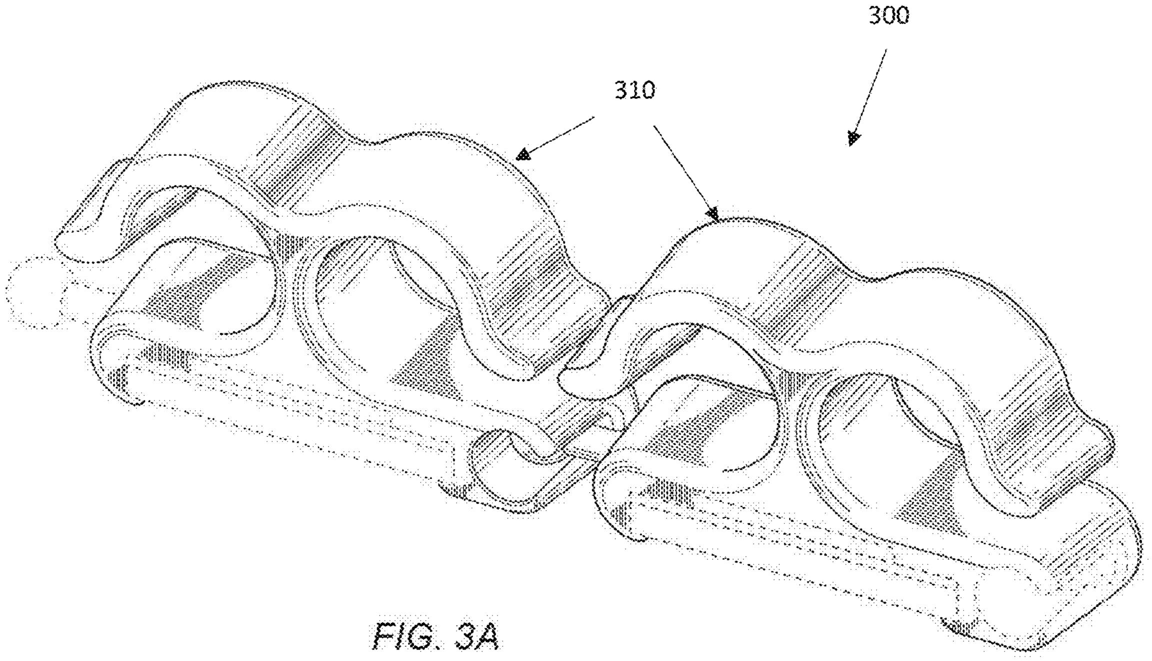
FIGS. 3A-3C are perspective, front, and top views, respectively, of a shaving device according to another embodiment of the present disclosure.
Figure 3B:
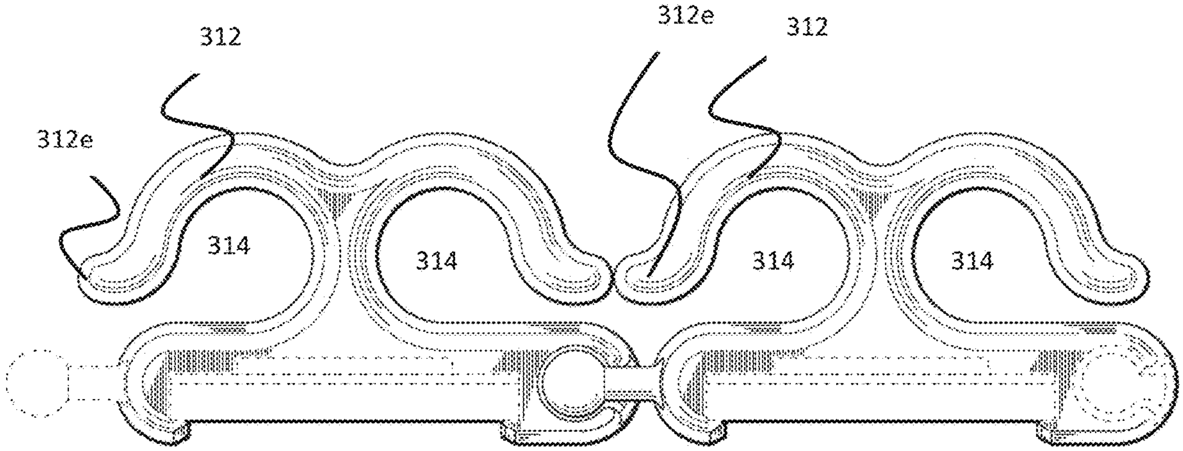
Figure 3C:
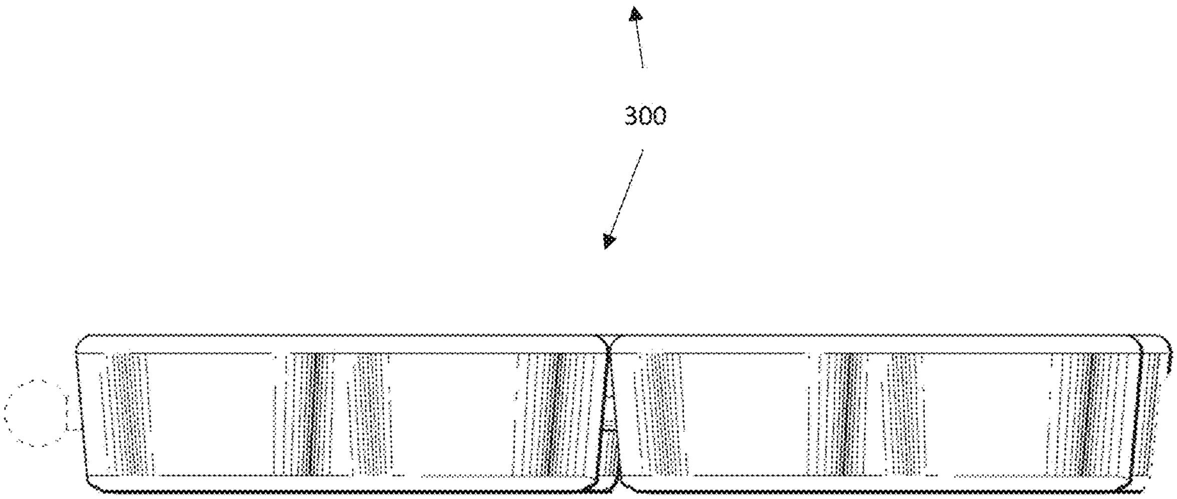

FIGS. 3A-3C show an alternative embodiment 300 with aperture 314 in which instead of tucking inwards, the ends 312*e* of the finger portions 312 flare outwards away from the center of the bodies 310 and/or the connecting portions 316.

The devices 200,300 and/or bodies 210,310 and elements thereof can have a wide variety of dimensions, and it is understood that all dimensions disclosed herein are exemplary in nature and other dimensions are possible. In one embodiment, one or more of the apertures 214 and/or apertures 314 can have a height (shown as "a" in FIG. 2B) of 0.25" to 1", or 0.4" to 0.8", or 0.5" to 0.75", or 0.25" or greater, or 0.4" or greater, or 0.5" or greater, or 1" or less, or 0.8" or less, or 0.75" or less. In one embodiment, one or more of the apertures 214 and/or apertures 314 can have a width (shown as "b" in FIG. 2B) of 0.25" to 1", or 0.4" to 0.8", or 0.5" to 0.75", or 0.25" or greater, or 0.4" or greater, or 0.5" or greater, or 1" or less, or 0.8" or less, or 0.75" or less. These dimensions can also be used for the diameter in circular or substantially circular embodiments, or as the largest or smallest dimension in other embodiments. The finger portions 212,312 and/or apertures 214,314 can have a depth of 0.25" to 1.5", or 0.4" to 1.25", or 0.5" to 1", or 0.65" to 0.85", or 0.25" or greater, or 0.4" or greater, or 0.5" or greater, or 0.65" or greater, or 1.5" or less, or 1.25" or less, or 1" or less, or 0.85" or less, or about 0.75". The finger portions 212,312 can have a thickness of about 0.1" to 0.5", or 0.15" to 0.35", or about 0.25" It is understood that these dimensions are only exemplary in nature, and many different embodiments are possible.

Returning to FIGS. 2A-2E, each body 210 can also include a shaver holding portion 230, such as the shaver holding portions 230*a*,230*b*. Each of the shaver holding portions 230 can include an aperture 234 be shaped so as to securely hold a shaving device 240 (e.g., the shaving devices 240*a*,240*b*), which can be, for instance, prior art razors, prior art replaceable razor cartridges such as the cartridges 156. The shaver holding portions 230 can include one or more flanges, such as the flanges 232, to hold the shaving devices 230 in place. The flanges 232 can be elastic, flexible, and/or biased such that it applies upward (i.e., toward the finger portions 212) pressure against its respective shaving device 230 to hold it in place. The apertures 234 can be substantially rectangular (e.g. rectangularly prismatic) in shape (as shown) (though other shapes are possible), and can also include cut-outs 236 at the top thereof, which can be used to accommodate the rear of a shaving device, such as the rear of a prior art replaceable cartridge 156.

The apertures 234, without the cut-outs 236, can have a width of 1" to 2.5", or 1.25" to 2", or 1.5" to 1.75", or 1" or more, or 1.25" or more, or 1.5" or more, or 2.5" or less, or 2" or less, or 1.75" or less; a depth of 0.25" to 1", 0.4" to 0.8", or 0.5" to 0.7", or 0.25" or more, or 0.4" or more, or 0.5" or more, or 1" or less, or 0.8" or less, or 0.7" or less; and/or a height (from top of flange) or 0.1" to 0.4", or 0.15" to 0.3", or 0.1" or more, or 0.15" or more, or 0.4" or less, or 0.3" or less. The cut-outs 236 can have a width of 0.5" to 1.5", or 0.75" to 1.25", or about 1", or 0.5" or more, or 0.75" or more, or 1.5" or less, or 1.25" or less; a height of 0.02" to 0.15", or 0.05" to 0.1", or about 0.08"; and/or a depth of 0.25" to 1", 0.4" to 0.8", or 0.5" to 0.7", or 0.25" or more, or 0.4" or more, or 0.5" or more, or 1" or less, or 0.8" or less, or 0.7" or less. It is understood that these dimensions are only exemplary in nature, and many different embodiments are possible.

Each body 210 can also include one or more connection devices for connection to another body 210. For instance, as shown in FIGS. 2A-2C, each of the bodies 210 includes one male connector 250 and one female connector 252, with the male connector 250 from the body **210*b* connected to the female connector 252 from the body 210*a*. The specific embodiment shown is a ball and socket arrangement, with the male connectors 250 including a post 250*a* and ball 250*b* and the female connectors 252 including an aperture 252*a*, with the ball 250*b* removable from the aperture 252*a* through the opening 252*b*, through the front of the shaver holding portion 230 and at the front of the aperture 252*a*. The aperture 242*a* can go all the way through the body 210, or (as shown) can go only partially through the body 210, which can provide a more secure connection. The aperture 242*a* can have a depth of less than 50%, 50% or more, or more than 50%, of the depth of the body 210**; and/or of 0.2" to 1", 0.4" to 0.8", or 0.5" to 0.7", or 0.2" or more, or 0.4" or more, or 0.5" or more, or 1" or less, or 0.8" or less, or 0.7" or less. It is understood that these dimensions are only exemplary in nature, and many different embodiments are possible.

The ball **250*b* can have a diameter larger than the diameter of the post 250*a*. For instance, the ball 250*b* can have a diameter of 0.1" to 0.5", or 0.2" to 0.4", or 0.25" to 0.35", though embodiments outside these ranges are possible. The ball 250*b* can be sized to fit within the aperture 252*a* and to be able to enter into/exit from the opening 252*b*, and thus the aperture 252*a* and/or opening 252*b* can have a diameter larger (e.g., slightly larger) than that of the ball 250*b*. For instance, the aperture 252*a* and/or opening 252*b* can have a diameter of 0.11" to 0.75", or 0.21" to 0.6", or 0.26" to 0.5". The post 250*a* can have a diameter smaller than that of the ball 250*b*, such as a diameter of 0.05" to 0.25", 0.1" to 0.2", or 0.125" to 0.175". Similar to the arrangement of the ball 250*b* with the opening 252*a*, the post 250*b* can be sized smaller (e.g., slightly smaller) than a channel 252*c* of the aperture 252*a*. The channel 252*c* can be through the side of the shaver holding portion 230 and at the side of the aperture 252*a*, so as to allow the post to slide forward and backward within the channel 252*c* such that the ball 250*b* slides forward and backward within the aperture 252*a*. The channel 252*c* can have a height larger (e.g., slightly larger) than the diameter of the post 250a so as to allow for movement, such as, for example, 0.06" to 0.4", 0.11" to 0.3", or 0.13" to 0.25". The height of the channel 252*c* can be smaller than the diameter of the ball 250*b* so as to prevent the ball 250*b* from exiting through the side of the shaver holding portion 230**.

The relative sizing of the connection devices can both allow and limit movement of the bodies **210*a*,210*b* relative to one another in a beneficial way. For instance, inclusion of a post 250a smaller than the channel 252*c* allows for sliding of the bodies 210*a*,210*b* forward and backward relative to one another, while the inclusion of a ball 250*b* larger than the channel 252*c* prevents accidental lateral separation of the bodies 210*a*,210*b*. Moreover, the described arrangement can also allow for at least some upward/downward (e.g., in the frontward-facing plane) and/or forward/backward (e.g., in the upward-facing plane) rotation of the bodies 210*a*,210*b* relative to one another, as shown by the arrows in FIG. 2A. While this rotatability may be limited due to other structures, it can provide for positional adjustment of the bodies 210*a*, 210*b* relative to one another to better fit the curvature of the surface being shaved, such as a leg, and thus provide distinct advantages over prior art shaving devices. Moreover, the fact that two shaving devices 240** (e.g., razor cartridges) are being used instead of one can result in a beneficial reduction in total shaving time.

While the connection devices described above has often been described with respect to circular elements having diameters, it is understood that these exemplary dimensions could also apply to non-circular elements, such as heights, lengths, widths, depths, largest dimensions, smallest dimensions, etc. Moreover, it is understood that these dimensions are only exemplary in nature, and many different embodiments are possible.

It is understood that other types of connections, including but not limited to male-female connections, fastener connections (e.g. hook-and-loop), adhesive connections, and other types of connections known in the art are possible. Additionally, it is understood that bodies 210 may have two or more male connectors and no female connectors, or two or more female connectors and no male connectors, or one male or female connector and no other connectors, or no connectors, or three or more male and/or female connectors; many different embodiments are possible. Moreover, the connectors may be an integral part of the body (i.e. the connector and body form a monolithic piece), or may be a separate component attached to the body.

The bodies 210,310 can have a wide variety of dimensions. By way of example only, the bodies 210,310 can have a height from 0.5" to 2.5", or 1" to 2", or 1.25" to 1.75", or about 1.5", or 0.5" or greater, or 1" or greater, or 1.25" or greater, of 1.5" or greater, of 2.5" or less, or 2" or less, or 1.75" or less, or 1.5" or less; a width (excluding the male connector 250) of 1" to 4", or 1.5" to 3.5", or 2" to 3", or 2.25" to 2.75", or 1" or greater, or 1.5" or greater, or 2" or greater, or 2.25" or greater, or 4" or less, or 3.5" or less, or 3" or less, or 2.75" or less; and/or a depth of 0.25" to 1", 0.4" to 0.8", or 0.5" to 0.7", or 0.25" or more, or 0.4" or more, or 0.5" or more, or 1" or less, or 0.8" or less, or 0.7" or less. It is understood that these dimensions are only exemplary in nature, and many different embodiments are possible.

The embodiments shown in FIGS. 2A-3C are only examples of embodiments of the present disclosure, and many other embodiments are possible. For instance, one embodiment does not include two finger portions, but instead includes a single aperture approximating the combined width of two apertures 214, through which a user can place two fingers. In another embodiment, two such apertures are combined such that a user can place four fingers through a single body, or a single body is otherwise configured for four or more fingers. In another embodiment, the finger portions 212 are not connected to one another by a connecting portion 216 (or otherwise integral and/or monolithic as shown in FIGS. 2A-2C), but instead are separate from one another, which can allow for more flexibility, while integral/monolithic embodiments can provide more sturdiness. Many different embodiments are possible.

Embodiments of shaving devices according to the present disclosure, such as the bodies 210,310, can be made from a variety of materials, including but not limited to polymers, metal, wood, plastics, glass, rubber, or other materials as would be understood by one of skill in the art. Some specific examples of materials for the shaving devices (e.g., the bodies 210,310) include thermoplastic polyurethane (TPU), thermoplastic elastomers (TPEs), and silicone. Combinations of these materials are also possible. The materials used can be water resistant and/or resistant to materials commonly used in bathing, such as soap, shampoo, etc. Shaving devices such as the bodies 210,310 can be made by, for example, injection molding, or other methods known in the art.

It is understood that embodiments presented herein are meant to be exemplary. Although the present disclosure has been described in detail with reference to certain preferred configurations thereof both in the specification and in the claims, other versions are possible. Embodiments of the present disclosure can comprise any combination of compatible devices/features described herein and/or shown in the figures, and these embodiments should not be limited to those expressly illustrated and discussed. For instance and not by way of limitation, the appended claims could be modified to be multiple dependent claims so as to combine any combinable combination of elements within a claim set, or from differing claim sets. Claims depending on one independent claim could be modified so as to depend from a different independent claim. Therefore, the spirit and scope of the disclosure should not be limited to the versions described above. Moreover, the spirit and scope of the disclosure should not be limited only to the described field, as it is envisioned that the devices and methods described herein could be applied to fields other than that specifically described herein.

While the foregoing written description of the disclosure enables one of ordinary skill to make and use what is considered presently to be the best mode thereof, those of ordinary skill will understand and appreciate the existence of variations, combinations, and equivalents of the specific embodiments, methods, systems, and examples herein. The disclosure should therefore not be limited by the above described embodiments, methods, systems, and examples. Furthermore, certain terminology has been used for the purposes of descriptive clarity, and not to limit the present disclosure. It is therefore intended that the following appended claims include all such alterations, modifications and permutations as fall within the true spirit and scope of the present disclosure. No portion of the disclosure is intended, expressly or implicitly, to be dedicated to the public domain if not set forth in the claims.

I claim:

1. A shaving device for assisting with shaving, comprising:

a first finger portion defining a first aperture configured for a user to place a first finger therethrough;

a second finger portion defining a second aperture configured for a user to place a second finger therethrough; and a shaver holding portion connected to said first finger portion and said second finger portion, wherein said shaver holding portion defines a cartridge aperture configured to hold a razor cartridge;

wherein said shaver holding portion comprises a male connector on a first side thereof and a female connector aperture on a second side thereof opposite said first side;

wherein said male connector comprises a ball and a post;

wherein said female connector is shaped to define an aperture opening and an aperture channel;

wherein said ball has a diameter larger than a dimension of said aperture channel;

wherein said device is configured such that when said male connector is connected to a female connector of a second said device, said first and second devices can rotate relative to one another; and wherein said device is configured such that when said female connector is connected to a male connector of a second said device, said first and second devices can rotate relative to one another.

2. The shaving device of claim 1, wherein said first finger portion, said second finger portion, and said shaver holding portion are integral with one another.

3. The shaving device of claim 1, wherein said first finger portion, said second finger portion, and said shaver holding portion are part of a monolithic body.

4. The shaving device of claim 1, wherein said shaver holding portion comprises two flanges underneath said cartridge aperture.

5. The shaving device of claim 1, wherein said first and second apertures are substantially circular.

6. The shaving device of claim 1, further comprising a razor cartridge held in said cartridge aperture.

7. The shaving device of claim 1, wherein said first finger portion and said second finger portion are joined by a connecting portion so as to be integral with one another.

8. A shaving device system for assisting with shaving, comprising:

a first body, comprising:

a first finger portion defining a first aperture configured for a user to place a first finger therethrough;

a second finger portion defining a second aperture configured for a user to place a second finger therethrough;

a first shaver holding portion connected to said first finger portion and said second finger portion, wherein said first shaver holding portion defines a first cartridge aperture configured to hold a first razor cartridge; and a male connector connected to said first shaver holding portion; and a second body, comprising:

a third finger portion defining a third aperture configured for a user to place a third finger therethrough;

a fourth finger portion defining a fourth aperture configured for a user to place a fourth finger therethrough;

a second shaver holding portion connected to said third finger portion and said fourth finger portion, wherein said shaver holding portion defines a second cartridge aperture configured to hold a second razor cartridge; and a female connector connected to said second shaver holding portion;

wherein said male connector and said female connector are configured such that when they are connected, said first cartridge aperture and said second cartridge aperture are exposed, and said first and second bodies can rotate relative to one another.

9. The shaving device of claim 8, wherein said male connector of said first body is connected to said female connector of said second body.

10. The shaving device of claim 8, wherein said female connector of said second body is a female connector aperture, and wherein said male connector of said first body is at least partially within said female connector aperture.

11. The shaving device of claim 8, wherein said female connector of said second body is a female connector aperture, and wherein said male connector of said first body is shaped to fit into said female connector aperture.

12. The shaving device of claim 11, wherein said male connector comprises a ball and a post, and wherein said female connector aperture is shaped to define an aperture opening and an aperture channel.

13. The shaving device of claim 12, wherein said ball has a diameter larger than a dimension of said aperture channel.

14. The shaving device of claim 13, wherein said aperture opening is sized to allow for entry and exit of said ball.

15. The shaving device of claim 8, wherein said first body further comprises a female connector connected to said first shaver holding portion and opposite said male connector of said first body, and wherein said second body further comprises a male connector connected to said second shaver holding portion and opposite said female connector of said second body.

16. The shaving device of claim 8, further comprising said first razor cartridge and said second razor cartridge, wherein said first razor cartridge is held in said first cartridge aperture and said second razor cartridge is held in said second cartridge aperture.

17. The shaving device of claim 8, wherein said first and second bodies are connected such that they can rotate relative to one another.

18. The shaving device of claim 17, wherein said first and second bodies are connected such that they can at least partially rotate in a first plane and a second plane perpendicular to said first plane.

* * * * *